3,449,343
PHTHALAZINIUM COMPOUNDS
Hans Ulrich Daeniker, Reinach, Basel-Land, Switzerland, assignor to Ciba Corporation, New York, N.Y., a corporation of Delaware
No Drawing. Filed Apr. 6, 1964, Ser. No. 357,824
Claims priority, application Switzerland, Apr. 10, 1963, 4,660/63; Oct. 25, 1963, 13,135/63; Feb. 7, 1964, 1,502/64
Int. Cl. C07d 51/06; A61k 27/00
U.S. Cl. 260—250        20 Claims The present invention relates to new phthalazinium compounds. Especially it concerns 2-aralkyl-phthalazinium compounds, the pseudo bases and anhydro compounds derived therefrom, and the other ethers of the pseudo bases.

The aryl radical in the new compounds is, for example, a naphthyl or more especially a phenyl radical.

The alkylene radical connecting the aryl radical with the phthalazine nucleus is more especially a lower alkylene radical, such as a methylene, ethylene or propylene group.

The new compounds may contain further substituents, more especially at the benzene nuclei lower alkyl radicals, such as methyl, ethyl, n-propyl, isopropyl or butyl radicals; hydroxyl groups; lower alkoxy groups such as methoxy, ethoxy, propoxy or butoxy groups; halogen atoms such as fluorine, chlorine or bromine or the pseudohalogen trifluoromethyl, or nitro groups; or on the heterocyclic nucleus in positions 1 and/or 4 lower alkyl groups, for example those mentioned above. The carbocyclic nucleus of the phthalazine radical contains advantageously 0, 1 or 2 of the above mentioned substituents.

The anions present in the new compounds are preferably those of therapeutically acceptable acids, for example those of strong inorganic acids, such as the hydrohalic acids (for example hydrochloric, hydrobromic or hydriodic acid), of sulfuric acid, or anions of organic acids, such as alkylsulfonic acids, for example of the methanesulfonic or ethanesulfonic acid, of arylsulfonic acids, for example para-toluenesulfonic acid or naphthalenesulfonic acids, or of acetic, oxalic, tartaric, citric, benzonic acid, or of naphthalenecarboxylic acids, or anions of alkylsulfuric acids, for example of methylsulfuric acid.

The new compounds possess valuable pharmacological properties. Inter alia, they display an antiparasitic, such as anthelmintic, action. In animal experiments, e.g. on mice and sheep, they are effective against tape worms. The new compounds can be used as tapeworm remedies. The pseudo bases and anhydro compounds are less toxic than the quaternary ammonium salts. The new compounds are also suitable as intermediates for the manufacture of other compounds having a pharmacological action.

Special mention deserve the 2-(polyhalogenobenzyl)-phthalazinium salts, and more especially the 2-(2':3':4':5':6'-pentahalogenobenzyl)-phthalazinium salts, such as the halides, the pseudo bases and anhydro compounds derived therefrom, and the ethers with aliphatic and araliphatic alcohols corresponding to these pseudo bases.

Of outstanding activity are the compounds of the formulae

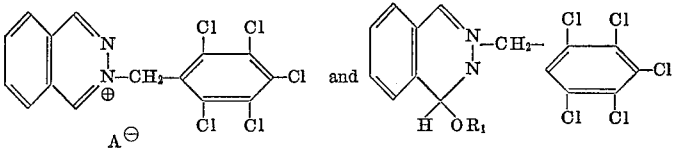

where $A^\ominus$ represents an anion, especially a non-toxic anion, e.g., a halogen anion, and $R_1$ a hydrogen atom, an alkyl radical which has 1–12, especially 1–6 carbon atoms, and may be substituted by a hydroxyl group or a lower alkoxy group, or a benzyl radical, and the corresponding anhydro campound, and particularly the 1-isopropoxy-2-(2', 3', 4', 5', 6'-pentachlorobenzyl) - 1,2-dihydrophthalazine and the 1-($\beta$-hydroxypropoxy)-2-(2', 3', 4', 5', 6'-pentachlorobenzyl)-1,2-dihydro-phthalazine.

The new compounds are manufactured in the known manner. For example, a phthalazine is reacted with a compound of the formula R—X (where R represents an aralkyl radical and X a reactive esterified hydroxyl group).

A reactive esterified hydroxyl group is more especially a hydroxyl group esterified with a strong inorganic acid, for example a hydrohalic or sulfuric acid, or with an organic sulfonic acid, for example a benzensulfonic acid.

The reactions according to the present process are preferably performed in the presence of diluents, at room temperature or with heating, if desired under superatmospheric pressure and/or under an inert gas.

Depending on the reaction conditions used the new compounds are obtained in the form of the quaternary salts, of the free ammonium hydroxides or of the pseudo bases or anhydro compounds derived therefrom, which may have the following formulae, exemplifying an unsubstituted phthalazine:

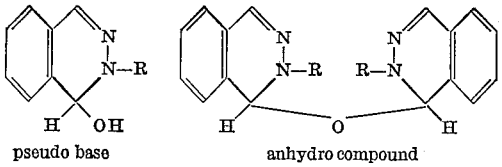

pseudo base            anhydro compound

The quaternary salts can be converted in the usual manner (for example by treatment with alkalines, such as alkali metal carbonates or hydroxides, or other suitable metal hydroxides or carbonates or with anion exchange resins) into the hydroxides, pseudo bases or anhydro compounds, or with suitable anion exchange resins into other salts. Pseudo bases, anhydro compounds or ammonium hydroxides can be converted into the corresponding quaternary salts by treatment with acids, especially with pharmacologically tolerable acids, such as hydrohalic acids, sulfuric, nitric, phosphoric, acetic, propionic, oxalic, malic, tartaric, citric, methanesulfonic, ethanesulfonic, hydroxyethanesulfonic, benzoic, salicylic, para-aminosalicylic or toluenesulfonic acid.

Depending on the nature of the radical R and the reaction conditions, the pseudo bases may split off water and thus become anhydro compounds.

The salts can be purified by conversion into the hydroxides, pseudo bases or anhydro compounds respectively, which are then converted into the pure salts.

Resulting quaternary ammonium compounds as well as the pseudo bases or anhydro compounds obtained therefrom can be converted in known manner into the ethers of the pseudo bases. Resulting quaternary ammonium salts, for example, can be reacted in the presence of strong bases, such as alkali hydroxides or alkali carbonates, e.g., the hydroxides or carbonates of sodium or potassium, with organic hydroxyl compounds, such as alcohols, or the pseudo bases or anhydro compounds can be treated with said organic hydroxyl compounds.

Resulting ethers can be converted into other ethers by treatment with organic hydroxyl compounds.

Alcohols suitable for etherification are for example aliphtic, cycloaliphatic or araliphatic alcohols. Aliphatic or cycloaliphtic alcohols are especially alkanols having 1–20 carbon atoms, such as methanol, ethanol, propanol, isopropanol, straight or branched butanols, pentanols or hexanols, capryl alcohol, lauryl alcohol or myristyl alcohol, cyclopentanol or cyclohexanol. The alcohols mentioned may be substituted, for example by hydroxyl groups or lower alkoxy groups, e.g., those mentioned above.

Araliphatic alcohols to be used are specially phenyl lower alkanols, such as benzyl alcohols or phenyl ethanols the phenyl radicals of which are unsubstituted or substituted for example in the manner shown above for the benzene nuclei.

The invention includes also any modification of the present process in which an intermediate obtainable at any stage of the process is used as starting material and any remaining step/steps is/are carried out or the process is discontinued at any stage thereof, or in which a starting material is formed in the course of the reaction or is used in the form of a salt thereof.

The starting materials are known or, insofar as they are new, they can be prepared by known methods. It is of advantage to use such starting materials as give rise to the final products described above as being especially valuable.

The new compounds may be used for example in the form of pharmaceutical preparations containing them or their salts in conjunction or admixture with an organic or inorganic, solid or liquid pharmaceutical excipient suitable for enteral or parenteral administration. Suitable excipients are substances that do not react with the new compounds, for example water, gelatine, lactose, starches, magnesium stearate, talcum, vegetable oils, benzyl alcohols, gums, polyalkylene glycols, white petroleum jelly, cholesterol or other known medicinal excipients. The pharmaceutical prepartions may be, for example, tablets or dragees, or in liquid form solutions, suspensions or emulsions. They may be sterilized and/or may contain assistants such as preserving, stabilizing, wetting or emulsifying agents, salts for regulating the osmotic pressure or buffers. They may also contain further therapeutically valuable substances. The preparations are formulated by the known methods.

The new compounds may also be used in the form of additives to animal fodder. In this connection, for example, the conventional extenders and diluents, or animal fodders respectively, are used.

The following examples illustrate the invention without restricting its scope thereto.

Example 1

A solution of 6.5 g. of phthalazine and 10 g. of 2:4-dichlorobenzyl chloride in 50 cc. of acetonitrile is refluxed for 1 hour, then cooled; the precipitated crystals are suctioned off and recrystallized from isopropanol, to yield 2-(2':4'-dichlorobenzyl)-phthalazinium chloride of the formula

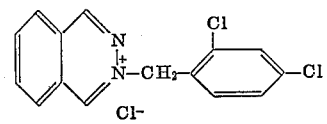

melting at 208–210° C. with decomposition.

Example 2

A solution of 6.5 g. of phthalazine and 8.1 g. of parachlorobenzyl chloride in 50 cc. of acetonitrile is refluxed for 4 hours, then considerably cooled; on stirring with a glass rod a crystalline precipitate forms which is suctioned off, washed with ether and recrystallized from absolute alcohol+ether 2:3, to yield 2-(parachlorobenzyl)-phthalazinium chloride of the formula

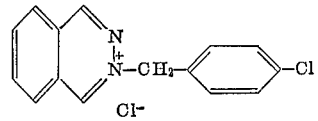

melting at 121–123° C.

Example 3

A solution of 6.5 g. of phthalazine and 10 g. of 3:4-dichlorobenzyl chloride in 50 cc. of acetonitrile is refluxed for 2 hours, cooled and left to itself for some time, and the precipitated crystals are suctioned off. Recrystallization from acetonitrile+isopropanol (10:1) yields 2-(3':4'-dichlorobenzyl)-phthalazinium chloride of the formula

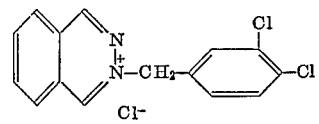

melting at 181–182° C.

Example 4

A solution of 6.5 g. of phthalazine and 15 g. of 2:3:4:5:6-pentachlorobenzyl chloride in 50 cc. of acetonitrile is refluxed. After 10 minutes the product begins to crystallize out, and is cooled after 1 hour, suctioned off and rinsed with ether. Recrystallization from absolute alcohol yields 2-(2':3':4':5':6'-pentachlorobenzyl)-phthalazinium chloride of the formula

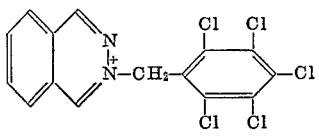

melting at 235–237° C. with decomposition.

Example 5

A mixture of 58.5 g. of phthalazine, 126 g. of 2,3,4,5,6-pentachlorobenzyl chloride and 500 ml. of alcohol is refluxed, a clear solution forming after about 30 minutes and the product beginning to crystallize out after 45 minutes. After 4 hours the batch is cooled and left to itself at 0° C. overnight. The crystals are filtered off with suction and recrystallized from 2 liters of alcohol containing some active carbon. The product which crystallizes at 0° C. is filtered with suction, washed with ether, and dried thoroughly. 2-(2',3',4',5',6'-pentachlorobenzyl)-phthalazinium chloride hemihydrate is obtained which loses its crystal water before it melts at 238–239° C., and thus is identical with the product obtained as described in Example 4 according to melting point and mixed melting point.

Example 6

20 g. of 2-(2',3',4',5',6'-pentachlorobenzyl)-phthalazinium chloride are dissolved in 100 ml. of concentrated sulfuric acid, the solution stirred for a short while and poured on 300 g. of ice. The resulting crystals are filtered off with suction, washed with water, and recrystallized from alcohol. 2-(2',3',4',5',6'-pentachlorobenzyl)-phthalazinium hydrogensulfate is obtained which has the formula

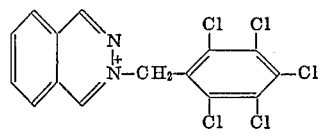

and melts at 250° C.

Example 7

50 ml. of 2 N sodium hydroxide solution are added to a hot solution of 25 g. of 2-(2′,3′,4′,5′,6′-pentachlorobenzyl)-phthalazinium chloride in 3.5 liters of water, the mixture allowed to stand at 0° C. for some time and then filtered with suction. The colorless crystals are well washed with water and 1-hydroxy-2-(2′,3′,4′,5′,6′-pentachlorobenzyl)1,2-dihydrophthalazine of the

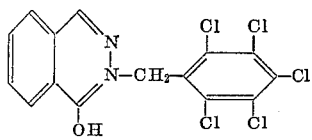

obtained which melts and decomposes at 213–215° C.

The compound can also exist in a second metastable modification of melting point 140–142° C. (with decomposition) (from ethyl acetate). Protracted heating in an inert solvent, e.g., ethyl acetate, results in the splitting off of water with dimerization to form bis-[2-(2′,3′,4′,5′,6′-pentachlorobenzyl)-1,2-dihydrophthalazine-1-yl] ether of the formula

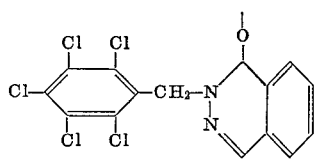

i.e., the anhydro compound of the above pseudo base.

Example 8

50 g. of 2-(2′,3′,4′,5′,6′-pentachlorobenzyl)-phthalazinium chloride are dissolved in 2 liters of methanol by boiling the mixture. 100 ml. of 2 N aqueous sodium hydroxide solution are added, then 250 ml. of water, and the batch allowed to stand at 0° C. for some time. The colorless crystalline precipitate is filtered off, washed well with water, and dried. By recrystallization from ethyl acetate or acetone pure 1-methoxy-2-(2′,3′,4′,5′,6′-pentachlorobenzyl)-1,2-dihydro-phthalazine of the formula

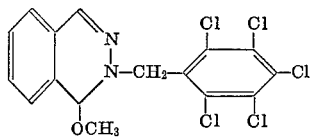

is obtained which melts and decomposes at 150° C.

Example 9

0.5 g. of 1-methoxy-2-(2′,3′,4′,5′,6′-pentachlorobenzyl)-1,2-dihydro-phthalazine is treated with 25 ml. of methanolic hydrochloric acid, the batch slightly heated to achieve complete dissolution, and then evaporated to dryness. The colorless crystalline residue is recrystallized from 10 ml. of absolute alcohol, and the 2-(2′,3′,4′,5′,6′-pentachlorobenzyl)-phthalazinium chloride of melting point 236–237° C. (with decomposition) obtained which is identical in every respect with the compound obtained according to Example 4.

Example 10

1-methoxy-2-(2′,3′,4′,5′,6′-pentachlorobenzyl)-1,2-dihydro-phthalazine is recrystallized twice from 20 times its quantity of isopropanol, and 1-isopropoxy-2-(2′,3′,4′,5′,6′-pentachlorobenzyl)-1,2-dihydrophthalazine of the formula

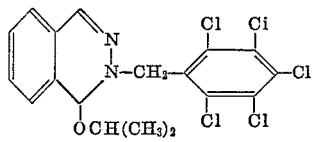

obtained which melts and decomposes at 130° C.

Example 11

10 ml. of methanolic hydrochloric acid are added to 0.3 g. of 1-isopropoxy-2-(2′,3′,4′,5′,6′-pentachlorobenzyl)-1,2-dihydro-phthalazine, and the resulting clear solution allowed to stand at room temperature for 10 minutes before it is evaporated to dryness. The colorless crystalline residue is recrystallized from absolute alcohol, and 2-(2′,3′,4′,5′,6′-pentachlorobenzyl)-phthalazinium chloride obtained which is identical in every respect with the compound obtained according to Example 4.

Example 12

A solution of 9 g. of 1-methoxy-2-(2′,3′,4′,5′,6′-pentachlorobenzyl)-1,2-dihydro-phthalazine and 12 g. of lauryl alcohol in 150 ml. of benzene is allowed to stand at room temperature for 2 days, then slowly concentrated on a water bath, and finally dried under reduced pressure. The residue is recrystallized from petroleum ether and 1-lauryloxy-2-(2′,3′,4′,5′,6′-pentachlorobenzyl)-1,2-dihydro-phthalazine of the formula

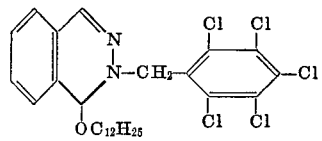

obtained which melts at 50° C.

Example 13

To a warm solution of 12 g. of 2-(2′,3′,4′,5′,6′-pentachlorobenzyl)-phthalazinium chloride in 150 ml. of 1,2-propylene glycol are added first 25 ml. of 2 N sodium hydroxide solution and then 50 ml. of water, the mixture cooled to 0° C., and the resulting colorless crystalline precipitate filtered off with suction. Recrystallization from acetone yields 1-(β-hydroxy-propoxy)-2-(2′,3′,4′,5′,6′-pentachlorobenzyl)-1,2-dihydro-phthalazine of the formula

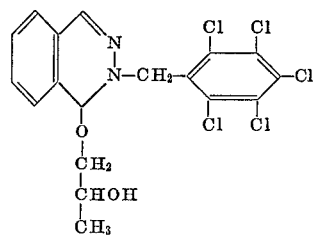

melting at 136–138° C.

Example 14

A mixture of 6.5 g. of phthalazine and 9 g. of para-nitrobenzyl chloride is refluxed in 50 ml. of acetonitrile for 2 hours, then cooled, and the precipitated crystals recrystallized from isopropanol. The 2-(para-nitrobenzyl)-phthalazinium chloride of the formula

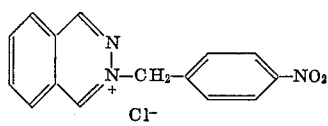

melting at 170–171° C. is obtained.

Example 15

A mixture of 6.5 g. of phthalazine and 9 g. of ortho-nitrobenzyl chloride is refluxed in 50 ml. of acetonitrile for 2 hours, then cooled, and the precipitated crystals recrystallized from isopropanol. The 2-(ortho-nitrobenzyl)-phthalazinium chloride of the formula

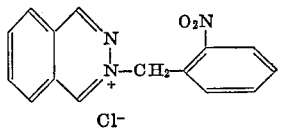

melting and decomposing at 192° C. is obtained.

Example 16

A mixture of 6.5 g. of phthalazine and 9 g. of meta-nitrobenzyl chloride is refluxed in 50 ml. of acetonitrile for 2 hours, cooled, and the precipitated crystals recrystallized from isopropanol. The 2-(meta-nitrobenzyl)-phthalazinium chloride of the formula

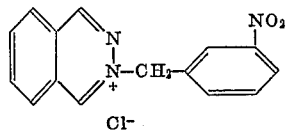

melting and decomposing at 223–224° C. is obtained.

Example 17

A mixture of 6.5 g. of phthalazine and 9.0 g. of α-chloromethylnaphthaline is refluxed in 50 ml. of acetonitrile for 2 hours, then cooled to 0° C. A viscous, oily precipitate forms from which the solvent is decanted, and which is dried under reduced pressure before it is dissolved in 30 ml. of hot water. On cooling, colorless crystals are obtained which are recrystallized from a small amount of isopropanol. 2-[(α-naphthyl)-methyl]-phthalazinium chloride of the formula

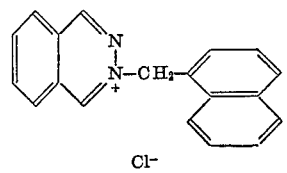

is obtained which melts and decomposes at 110° C.

Example 18

A mixture of 7.5 g. of meta-fluorobenzyl chloride and 6.5 g. of phthalazine is refluxed in 50 ml. of acetonitrile for 2 hours, then cooled, and the crystals which precipitate are recrystallized from acetonitrile. 2-(meta-fluorobenzyl)-phthalazinium chloride of the formula

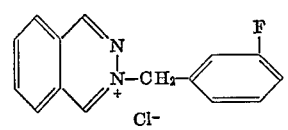

is obtained which melts at 171–173° C.

Example 19

A mixture of 40 g. of phthalazine, 90 g. of 2,3,4,5,6-pentachlorobenzyl chloride and 1.5 liters of isopropanol are refluxed for 5 hours. 250 ml. of 2 N sodium hydroxide solution, then 1.5 liters of water are added to the clear solution while it is still warm. The batch is cooled to 0° C., filtered with suction, and the filter residue washed with water. The resulting crystals are recrystallized twice from isopropanol, and 1-isopropoxy-2-(2',3',4',5',6'-pentachlorobenzyl)-1,2-dihydrophthalazine obtained which is identical in every respect with the product obtained according to Example 10.

Example 20

A solution of 1.2 g. of sodium in 100 ml. of methanol is added to a solution of 21.5 g. of 2-(2',3',4',5',6'-pentachlorobenzyl)-phthalazinium chloride in 700 ml. of hot methanol. A dense crystalline precipitate forms which, after cooling, is filtered off with suction and recrystallized from 450 ml. of ethyl acetate. 1-methoxy-2-(2',3',4',5',6'-pentachlorobenzyl)-1,2-dihydro-phthalazine is obtained which is identical in every respect with the product obtained according to Example 8.

Example 21

A mixture of 15 g. of 2,3,4,5,6-pentachlorobenzyl chloride and 7.2 g. of 1-methyl-phthalazine in 50 ml. of alcohol is refluxed for 2½ hours and then cooled to 0° C. The crystals that precipitate are filtered off with suction and recrystallized from 140 ml. of alcohol. 1-methyl-3-(2',3',4',5',6'-pentachlorobenzyl)-phthalazinium chloride of the formula

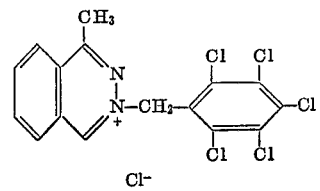

is obtained in the form of slightly yellowish-colored crystals melting with decomposition at 244–245° C.

Example 22

Dragées containing 100 mg. of 2-(2',3',4',5',6'-pentachlorobenzyl)-phthalazinium choride can be made, for example as follows:

| | Mg. per dragée |
|---|---|
| 2 - (2',3',4',5',6' - pentachlorobenzyl-phthalazinium chloride | 100.0 |
| Lactose | 98.6 |
| Wheat starch | 60.0 |
| Colloidal silicic acid with hydrolyzed starch | 9.0 |
| Gelatine | 1.5 |
| Arrowroot | 15.0 |
| Talcum | 15.0 |
| Magnesium stearate | 0.9 |
| | 300.0 |

Preparation 2-(2',3',4',5',6'-pentachlorobenzyl)-phthalazinium chloride is homogeneously mixed with lactose, wheat starch and colloidal silicic acid with hydrolyzed starch. On a water bath, the gelatine is dissolved in about ten times its quantity of water. With the solution obtained, the rest of the mixture is moistened and then continuously stirred while being treated with water until a slightly plastic mass is formed. The mass is then passed through a 4–5 mm. mesh sieve, and dried at 40–45° C. The dried granulate is forced through a sieve having a mesh width of 0.8–1.4 mm. to render the grain size as uniform as possible. Arrowroot, talc and magnesium sterate are mixed, screen and admixed homogeneously with the granulate as lubricant and disintegrating agent. The mixture is now compressed in the usual manner into dragée cores having a diameter of 9 mm. and a weight of 300 mg.

By a known procedure, these cores are then made up into dragées up to a total weight of 500 mg. each.

Example 23

In an analogous manner to that described in Example 4 there may be prepared from 2:3:4:5:6-pentachlorobenzyl chloride and 5-methoxy-phthalazine, 5-hydroxyphthalazine, 6-chlorophthalazine, 6-methylphthalazine, 5-bromophthalazine or 6-trifluoromethylphthalazine respectively the 5-methoxy-2-(2',3',4',5',6'-pentachlorobenzyl)phthalazine and the 8-methoxy-2-(2',3',4',5',6'-pentachlorobenzyl)-phthalazine, the 5-hydroxy-2-(2',3',4',5',6'-pentachlorobenzyl)-phthalazine and the 8-hydroxy-2-(2',3',4',5',6'-pentachlorobenzyl)-phthalazine, the 6-chloro-2-(2',3',4',5',6'-pentachlorobenzyl)-phthalazine and the 7-chloro-2-(2',3',4',5',6'-pentachlorobenzyl)-phthalazine, the 6-methyl-2-(2',3',4',5',6'-pentachlorobenzyl)-phthalazine and the 7 - methyl - 2 - (2′,3′,4′,5′,6′ - pentachlorobenzyl)phthalazine, the 5 - bromo - 2-(2′,3′,4′,5′,6′-pentachlorobenzyl)-phthalazine and the 8-bromo-2-(2′,3′,4′,5′,6′-pentachlorobenzyl)-phthalazine and the 6-trifluoromethyl-2-(2′,3′,4′,5′,6′-pentachlorobenzyl)-phthalazine and the 7-trifluoromethyl-2-(2′,3′,4′,5′,6′-pentachlorobenzyl)-phthalazine.

Example 24

In an analogous manner to that described in Example 12, there may be prepared from 1-methoxy-2-(2′,3′,4′,5′,6′-pentachlorobenzyl)-1,2-dihydrophthalazine and benzyl alcohol, meta-methoxybenzyl alcohol, para-chlorobenzyl alcohol, ortho-methylbenzyl alcohol, para-hydroxybenzyl alcohol respectively the 1-benzyloxy-2-(2′,3′,4′,5′,6′-pentachlorobenzyl)-1,2-dihydrophthalazine, the 1-(meta-methoxybenzyloxy) - 2 - (2′,3′,4′,5′,6′-pentachlorobenzyl)1,2-dihydrophthalazine, the 1-(para-chlorobenzyloxy)-2-(2′,3′,4′,5′,6′-pentachlorobenzyl)-1,2-dihydrophthalazine, the 1 - (ortho-methylbenzyloxy)-2-(2′,3′,4′,5′,6′-pentachlorobenzyl)-1,2-dihydrophthalazine, the 1-(para-hydroxybenzyloxy) - 2 - (2′,3′,4′,5′,6′-pentachlorobenzyl)-1,2-dihydrophthalazine and the 1-(meta-trifluoromethyl-benzyloxy)-2 - (2′,3′,4′,5′,6′ - pentachlorobenzyl)-1,2-dihydrophthalazine.

What is claimed is:

1. A member selected from the group consisting of compounds of the formula

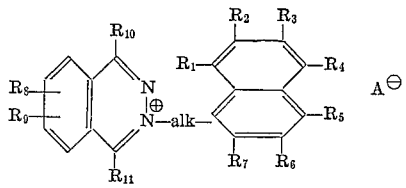

in which $R_1$ to $R_9$ each stands for a member selected from the group consisting of hydrogen, lower alkyl, hydroxy, lower alkoxy, halogen, trifluoromethyl and nitro, $R_{10}$ and $R_{11}$ each stands for a member selected from the group consisting of hydrogen and lower alkyl, alk stands for lower alkylene and $A^\ominus$ for a physiologically tolerable anion, their pseudo bases, anhydro-compounds and ethers of the pseudo bases derived from alcohols selected from the group consisting of alkanols having 1 to 20 carbon atoms, lower cycloalkanols, phenyl-lower alkanols, lower alkyl - phenyl - lower alkanols, hydroxyphenyl - lower alkanols, lower alkoxy-phenyl-lower alkanols, halogenophenyl-lower alkanols, trifluoromethyl-phenyl-lower alkanols, hydroxy-alkanols having 1 to 20 carbon atoms and alkoxyalkanols having 1 to 20 carbon atoms.

2. A member selected from the group consisting of compounds of the formula

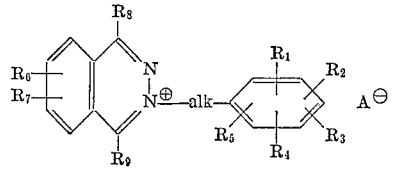

in which $R_1$ stands for a member selected from the group consisting of hydroxy, lower alkoxy, halogen, trifluoromethyl and nitro, $R_2$ to $R_6$ each stands for a member selected from the group consisting of hydrogen, lower alkyl, hydroxy, lower alkoxy, halogen, trifluoromethyl and nitro, $R_7$ stands for a member selected from the group consisting of lower alkyl, hydroxy, lower alkoxy, halogen, trifluoromethyl and nitro, $R_8$ and $R_9$ each stands for a member selected from the group consisting of hydrogen and lower alkyl, alk stands for lower alkylene and $A^\ominus$ for a physiologically tolerable anion, their pseudo bases, anhydro-compounds and ethers of the pseudo bases derived from alcohols selected from the group consisting of alkanols having 1 to 20 carbon atoms, lower cycloalkanols, phenyl-lower alkanols, lower alkyl-phenyl-lower alkanols, hydroxyphenyl-lower alkanols, lower alkoxy-phenyl-lower alkanols, halogeno-phenyl-lower alkanols, trifluoromethyl - phenyl - lower alkanols, hydroxyalkanols having 1 to 20 carbon atoms and alkoxyalkanols having 1 to 20 carbon atoms.

3. A member selected from the group consisting of compounds of the formula

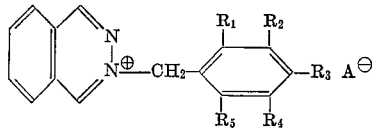

in which $R_1$ to $R_5$ each stands for halogen and $A^\ominus$ for a non-toxic anion, their pseudo bases, anhydro-compounds and ethers of the pseudo bases with alcohols selected from the group consisting of alkanols having 1 to 20 carbon atoms, lower cycloalkanols, phenyl-lower alkanols, lower alkyl-phenyl-lower alkanols, hydroxyphenyl-lower alkanols, lower alkoxky-phenyl-lower alkanols, halogenophenyl-lower alkonols, trifluoromethyl - phenyl-lower alkonols, hydroxyalkanols having 1 to 20 carbon atoms and alkoxyalkanols having 1 to 20 carbon atoms.

4. A compound selected from the group consisting of those of the formulae

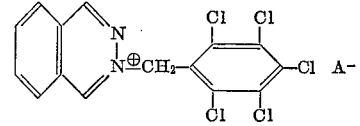

and

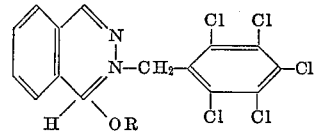

wherein $A^\ominus$ represents a non-toxic anion and R is a member selected from the group consisting of hydrogen, 1–12 carbon atom alkoxy and 1–12 carbon atom hydroxyalkyl.

5. 2 - (2′,3′,4′,5′,6′-pentachlorobenzyl) - phthalazinium halide.

6. 2 - (2′,3′,4′,5′,6′-pentachlorobenzyl) - phthalazinium chloride.

7. 2 - (2′,4′ - dichlorobenzyl) - phthalazinium salt.

8. 2 - (para-chlorobenzyl)-phthalazinium salt.

9. 2 - (3′,4′-dichlorobenzyl)-phthalazinium salt.

10. 2 - (β-phenylethyl)-phthalazinium salt.

11. 1 - hydroxy - 2 - (2′,3′,4′,5′,6′ - pentachlorobenzyl)-1,2-dihydrophthalazine.

12. Bis-[2-(2′,3′,4′,5′,6′-pentachlorobenzyl) - 1,2-dihydro-phthalazine-1-yl]-ether.

13. 1 - methoxy - 2 - (2′,3′,4′,5′,6′-pentachlorobenzyl)-1,2-dihydro-phthalazine.

14. 1 - isopropoxy-2-(2′,3′,4′,5′,6′-pentachlorobenzyl)-1,2-dihydro-phthalazine.

15. 1 - lauryloxy - 2 - (2′,3′,4′,5′,6′ - pentachlorobenzyl)-1,2-dihydro-phthalazine.

16. 1 - (β-hydroxy-propoxy)-2-(2′,3′,4′,5′,6′-pentachlorobenzyl)-1,2-dihydro-phthalazine.

17. 2-nitrobenzyl-phthalazinium salt.

18. 2-[(α-naphthyl)-methyl]-phthalazinium salt.

19. (2-meta-fluorobenzyl)-phthalazinium salt.

20. 1 - methyl - 3 - (2′,3′,4′,5′,6′ - pentachlorobenzyl)-phthalazinium salt.

References Cited

Rowe et al., Jour. Chem. Soc, (London) pp. 829–837 (1947).

Rowe et al., Jour. Chem. Soc. (London) pp. 461–468 (1947).

NICHOLAS S. RIZZO, *Primary Examiner.*

U.S. Cl. X.R.

424—250